United States Patent [19]

Hazebrouck

[11] Patent Number: 4,858,040
[45] Date of Patent: Aug. 15, 1989

[54] BIMORPH ACTUATOR FOR A DISK DRIVE

[75] Inventor: Henry B. Hazebrouck, Sunnyvale, Calif.

[73] Assignee: Ampex Corporation, Redwood City, Calif.

[21] Appl. No.: 89,097

[22] Filed: Aug. 25, 1987

[51] Int. Cl.⁴ .......................... G11B 5/55; G11B 5/596
[52] U.S. Cl. .............................. 360/78.05; 360/77.02; 360/78.12; 360/109
[58] Field of Search ...................... 360/75, 77, 78, 107, 360/109, 106, 77.01, 77.02, 77.03, 77.04, 77.05, 77.06, 77.07, 77.08, 77.11, 77.16, 77.12, 78.01, 78.02, 78.04, 78.05, 78.12

[56] References Cited

U.S. PATENT DOCUMENTS

| | | | |
|---|---|---|---|
| 3,924,268 | 12/1975 | McIntosh et al. | 360/78 |
| 4,188,645 | 2/1980 | Ragle | 360/75 |
| 4,374,402 | 2/1983 | Blessom et al. | 360/109 |
| 4,393,425 | 7/1983 | Wright | 360/109 |
| 4,492,992 | 1/1985 | Rooney et al. | 360/78 |
| 4,583,135 | 4/1986 | Kimura | 360/77 |

FOREIGN PATENT DOCUMENTS 54-49108  4/1979  Japan .................................. 360/109

*Primary Examiner*—Aristotelis M. Psitos
*Assistant Examiner*—Steven R. Garland
*Attorney, Agent, or Firm*—Harry G. Thibault; Richard P. Lange

[57] ABSTRACT

A movable actuator supporting a stacked assembly of read/write heads for unitary movement adjacent respective disk surfaces of a disk drive mechanism, the movable actuator incorporating a series of secondary actuators, one for each head, each secondary actuator including a bimorph member with piezoelectric properties, and capable of extremely precise movements for secondary positioning.

4 Claims, 3 Drawing Sheets

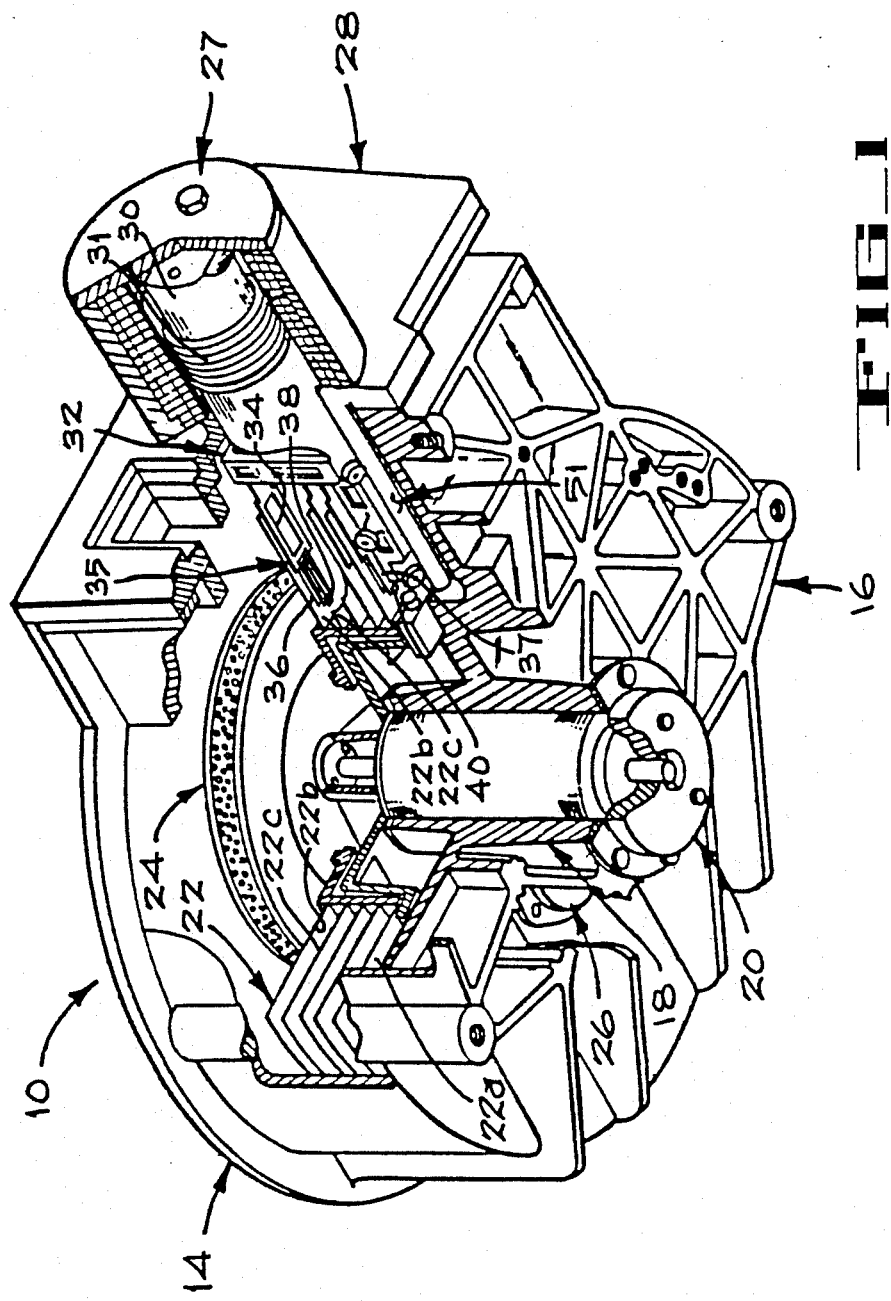

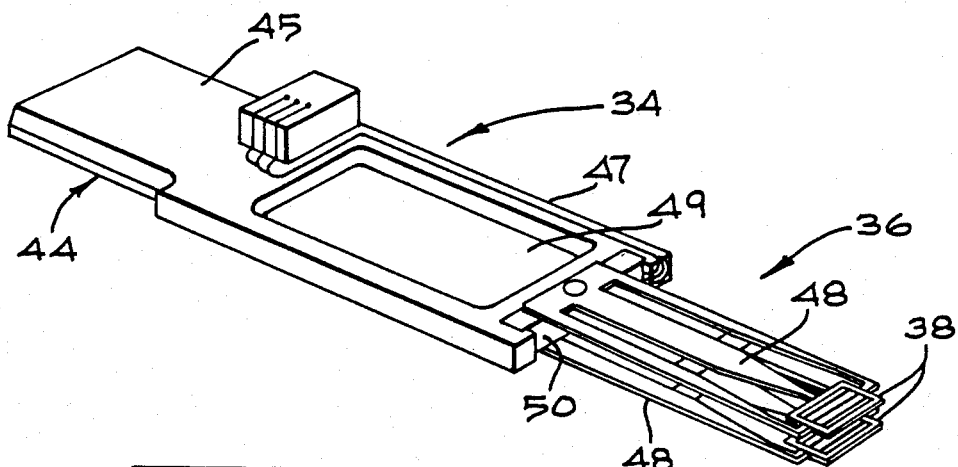
FIG_2A
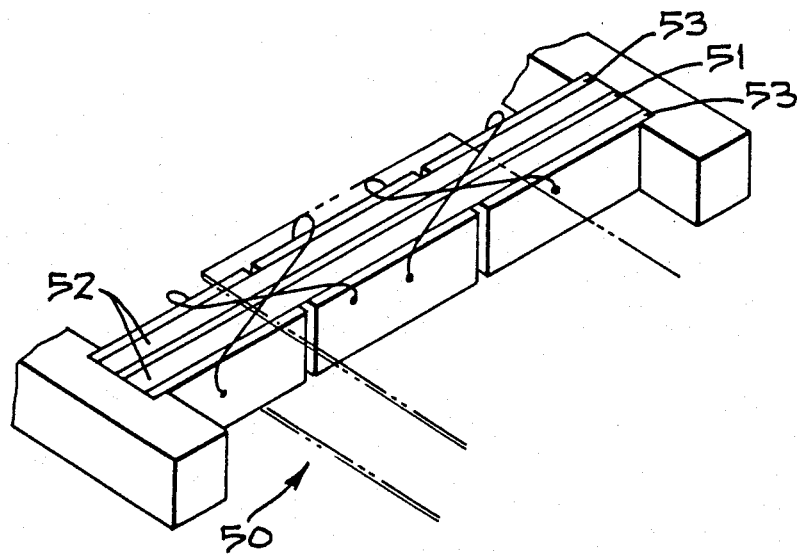
FIG_2B
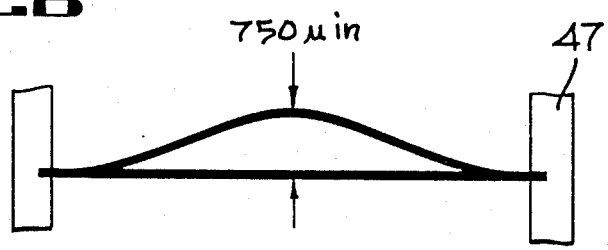
FIG_2C

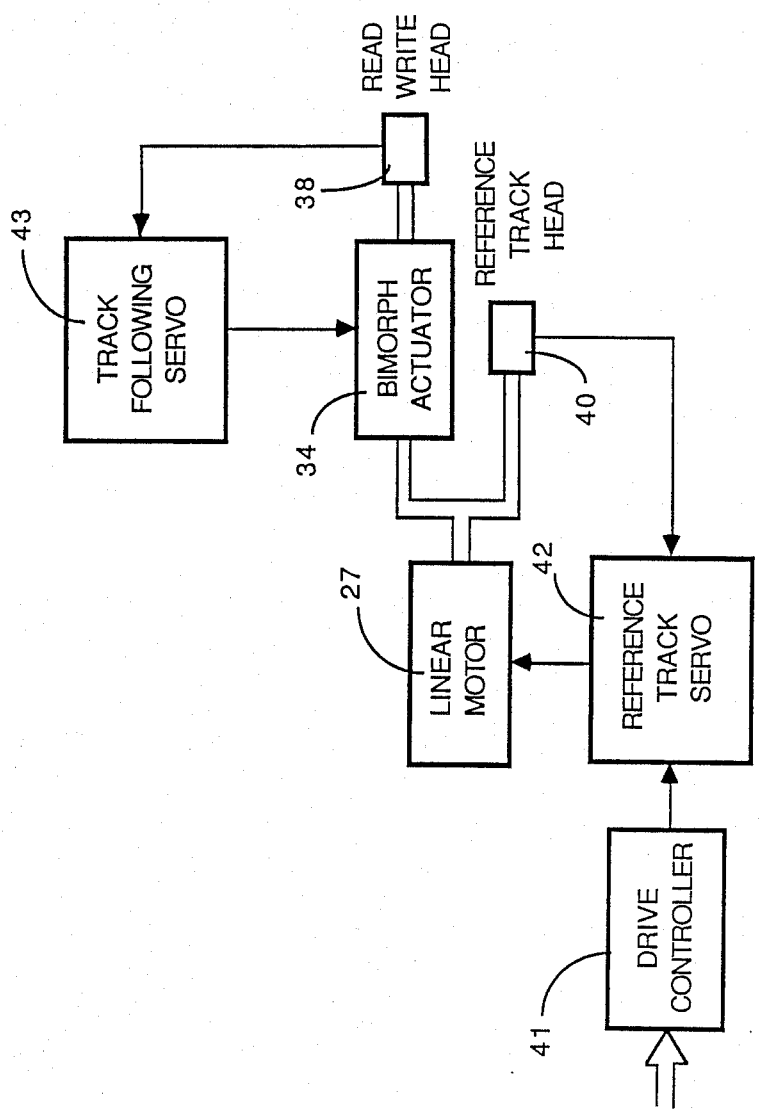
FIG_3

BIMORPH ACTUATOR FOR A DISK DRIVE

BACKGROUND AND SUMMARY OF THE INVENTION

The present invention pertains to disk drives and in particular to a disk drive actuator designed for improved tracking performance.

In a disk drive, which is a data storage device, a series of data carrying members or disks are rigidly mounted on a rotatable spindle. Data is either written on or read from a series of tracks positioned adjacent to each other and extending across the width of each disk. A series of read/write heads are mounted as a head stack on a disk drive actuator with individual heads positioned for one-to-one correspondence with respective disk surfaces with unitary movement of the head stack moving each head across the tracks provided on its respective disk. A signal input to an electromagnetic core mounted on the actuator controls the movement of the actuator and positions all of the read/write heads mounted thereon as a unit. Control of the positioning of the actuator may be provided by servo information carried on one of the data carrying surfaces of the disks, to be input to a servo read/write head, to be transmitted to the input of the electromagnetic core driving the actuator.

A number of different ways are known to increase the storage capacity of disk drives. One method is to increase the data storage capacity by increasing the linear density of the data for a disk of a given diameter to increase the amount of data stored on each track. Another method is to narrow the data tracks on each disk to enable the designer to increase the number of tracks placed on a disk surface. Because each of these approaches places its own unique demands on the tracking servo, the read/write heads and their support systems, or, those portions of the disk drive system dedicated to data storage and retrieval, many designs combine both techniques to achieve improved data storage capacity for the system.

But increased data storage is only a first step in a successful new design. Substantial improvement in access time to the data must be achieved to complement increased data storage if improved data input/output of the disk drive mechanism is to be achieved. Access time is most easily reduced by increasing the rate at which data is read from or written on the disk surface. Additionally, improvement in access time means a meaningful decrease in the amount of time needed by the actuator to transfer a read/write head from one data track to another.

However, because the number of data tracks on each disk surface is substantially increased, with the width of each data track correspondingly narrowed, the accuracy of the head positioning mechanism is critical in the alignment of a read/write head with the proper data track on its respective disk surface, and becomes even more critical as the transfer times of associated read/write heads from one data track to another are reduced to reduce access times.

Prior art actuators support a plurality of read/write heads in stacked relation for alignment of all heads as a single unit, with each head aligned with a respective disk surface of a disk stack. All of the read/write heads move as a unit, as the actuator is driven by a servo input obtained from one of the data carrying surfaces of the disk stack. The single actuator performs all positioning functions required by the mechanism.

However, a substantial increase in the data tracks laid on a single disk surface, coupled with a corresponding decrease in the width of those tracks, when added to increased speed inputs for both the spindle and the actuator, places substantial demands on precision and accuracy in a read/write actuator.

To provide improved levels of precision and accuracy in data storage and retrieval, the disk drive requires not only a primary actuator to drive the heads across the disk to perform uniform positioning of the head stack at an approximate track position but also a secondary actuator for each head which is dedicated solely to the fine positional alignment of a read/write head on its respective proper data track with an increased accuracy.

In the present invention, the piezo-electric effect produced by certain materials is used to advantage in the design of an improved actuator for a disk drive to produce the small, precise and controlled movements required for the improved positional alignment of individual read/write heads by the improved actuator. In the present invention the secondary actuator which is used to positionally align an individual read/write head with respect to a selected track on a respective disk surface includes a bimorph support member which has the same properties as a piezo-electric material and which bends when a voltage is applied thereto. Thus, a controllable electrical input can produce a small, measurable and precise mechanical movement in the bimorph support member and its associated head to align the head with its associated track with precision and accuracy. A primary actuator comprises a sectioned arm having at one end an electromagnetic or similar driving apparatus and at an opposite end multiple pairs of read/write heads, each head mounted on a bimorph support member of each secondary actuator to be fine positioned to lie adjacent a respective disk surface of the disk drive apparatus for read/write output/input. The bimorph support member or secondary actuator is supported at its opposite ends by the support structure of the actuating system. The conductive coating on the bimorph support member is etched and reconnected such that an applied voltage will move the member forward. The read/write head attached to the center of the bimorph support member also moves when a voltage is applied to the member.

In addition to the advantage of improved positioning accuracy produced by the new actuator, the tolerances of other mechanisms in the disk drive structure become less critical when improved positioning performance is achieved by each of the secondary actuators. Additional advantages will become apparent upon consideration of the detailed description of the invention as set forth below particularly when considered in combination with the drawings provided.

BRIEF DESCRIPTION OF THE DRAWINGS

FIG. 1 is a perspective drawing of a head disk assembly which has been modified to include a linear actuator of the type taught by the present invention;

FIG. 2A is a perspective drawing of the bimorph actuator of the present invention;

FIG. 2B is a perspective view of one of the bimorph support members of FIG. 2A, drawn to a larger scale;

FIG. 2C is a deflection curve of the bimorph support member; and

FIG. 3 is a block diagram of the signal system driving the actuator assembly.

As shown in FIG. 1 a head disk assembly 10 incorporating the improved actuator of the present invention comprises a cover 14, a base plate 16, a spindle 18 rotatably mounted on the base plate 16, and a drive system 20 operatively connected to the spindle 18. Rigidly mounted on the spindle 18 for rotation therewith are a series of disks 22 for data recording, storage and reproduction. In the depicted embodiment of FIG. 1, five 14-inch disks 22 are mounted on the spindle 18. Also associated with the head disk assembly 10 is a recirculating filter 24 and a breather filter 26.

A linear motor 27 is mounted on an end plate 28 of the head disk assembly 10. A center pole 30 of the linear motor 27 extends inwardly to receive an electromagnetic coil 31 provided at one end of a linear actuator 32, the coil 31 mounted to be coaxial with the center pole 30, for translatory movement along the axis thereof. At the opposite end of the linear actuator 32 a series of bimorph actuators 34, one of which is shown in FIG. 2A, are mounted in stacked relation as part of an actuator assembly 35. Each bimorph actuator 34 supports a head assembly 36 comprising a pair of read and write heads 38. A lower arm 37 of the linear actuator 32 supports a servo head 40 which engages a servo disk 22a which provides positioning information for the actuator 32 and to provide coarse positioning information to the head assemblies 36, each of which is associated with a respective secondary or bimorph actuator 34.

Piezo-electric materials exhibit a change in strain when subjected to an electric field. The field produces a distortion in a piezo-electric crystal and results in an elongation of the crystal in the direction of the applied field, which in turn causes a contraction perpendicular to the applied field.

The bimorph actuator 34 is an extremely small, light weight secondary actuator which uses the piezo-electric effect to convert electrical energy into mechanical energy to control individual, or a pair of, heads 38. It has the advantage of being able to reduce DC tracking errors often accompanying thermogradients in the disk drive 10. Also, because of its light weight, it can be used in a high band width system. And in fact, because of the low mass and high resonant frequency achieved in the bimorph actuator 34, band widths in excess of 1500 hertz can be achieved. The improved gain characteristics provided by a high bandwidth system contributes substantially to the ability of the bimorph actuator 34 to precisely align the head 38 with its associated track on the disk surface.

In the preferred embodiment of the present invention as shown in FIG. 2A, the read/write heads 38 are configured as a stacked pair to read the respective bottom surface of one disk 22b and the top surface of an adjacent disk 22c. The bimorph actuator 34 is configured as follows. A longitudinal arm 44 has a rearward extension 45 for connecting the bimorph actuator 34 to the actuator assembly 35 and a forward extension 47 for supporting a pair of flexures 48 extending from the front of the head arm 44 outwardly to carry at an outer end the pair of read/write heads 38 arranged in non-facing relation. Provided within the head arm 44 is a rectangular opening 49 which extends rearwardly of the attachment point for the head flexures 48, which gives the drive manufacturer the option of locating a second bimorph actuator and two more heads at the rear of the opening 49.

At a forward end of the rectangular opening 49 is mounted a bimorph support member 50. As seen in FIG. 2B, the bimorph support member 50 is about 1" long and is rigidly attached at both ends to the head arm 44. The bimorph support member 50 is comprised of a thin brass vane or shim 51 which is sandwiched between two ceramic sheets 52 of ferroelectric material. The ceramic sheets 52 are plated with copper to form electrodes. A thin nickel plating 53 is provided on opposite faces of the ceramic 52. A voltage is applied between one of the nickel electrodes 53 and the brass shim 51 to produce an electric field in the ceramic 52, which causes the ceramic 52 to contract along its length while the brass shim 51 retains its original length, causing the bimorph support member 50 to bend. In the preferred embodiment a 10 mil strip of copper and nickel plating has been etched away from both sides ¼" from the ends. The electrodes 53 are then reconnected such that the two ends of one side of the bimorph support member 50 are electrically connected to the middle of the opposite side. A voltage is now applied to the electrodes 53 to produce a positive bending moment at the two ends while the center of the bimorph support member 50 will experience a negative bending moment. Of course the opposite result is easily produced. As shown in the deflection curve of FIG. 2C the typical deflection of the bimorph element 50 is 750 u in. in one direction or 1500 u in. total. The end result is that the bimorph support member 50 deflects as if a force were applied to its center. The head flexures 48 mounted at the center of the bimorph support member 50 move in small, controlled precise increments, and parallel to the associated disk surface, when a controlled voltage is applied to the member. Thus the bimorph actuator 34 provides an extremely small, light weight actuator 34 which controls individual or pairs, of heads 38.

In high data storage capacity disk drives, the provision of a second bimorph support member at the rear of the opening 49, the rear member also carrying two head flexures 48, each with its own read/write head 38, effectively doubles the rate of data storage and retrieval for the system. The bimorph actuator 34 is able to minimize the DC tracking errors most often accompanying thermogradients in a disk drive. Also, because of its light weight the bimorph actuator 34 is useable with a high band width control system.

A block diagram is provided in FIG. 3 to depict the respective signal inputs. In the preferred embodiment, as a matter of design choice, lowermost disk surface 22a of the lowermost disk 22 is programmed to carry servo information. However, the servo information can be put anywhere. For example, some manufacturers now put the servo information on the center disk. Here, the servo disk provides a signal input to the servo head 40 of the actuator assembly 35, which input is delivered to the linear motor 27. A drive controller 41 supplies a drive signal to the linear motor 27 via a reference track servo 42. A coarse tracking signal obtained from the reference track head 40 is combined with the drive signal from the drive controller 41 in the reference track servo 42, to supply a coarse tracking control signal to the linear motor 27 to drive the actuator assembly 35 to a coarse track position. The linear motor 27 drives the bimorph actuators 34 and their associated read/write heads 38, as well as the reference track head 40. Track fine positioning is achieved by the track following servo 43 which receives a fine position servo tracking signal from each disk surface associated with a respective read/write head 38 to provide a tracking control signal to each bimorph actuator 34 which fine positions its respective head 38 adjacent its selected data track. It should be noted that mounting two heads 38 on a single bimorph support member 50 is not as efficient as providing one head 38 per bimorph 50, since either the servo input from each disk surface to the bimorph 50 must be averaged to drive the bimorph 50 to a single "averaged" track location for both of the disk surfaces providing a servo input, or each head must be corrected separately, with enough time allowed after settling of the first head for the second head to settle in its own read/write position.

A standardized series of tests were performed to evaluate the performance of the bimorph actuator 34. The standard chosen against which to compare the performance of the bimorph actuator 34 was the Ampex DF 9300 actuator (not shown). The DF 9300 actuator was chosen since the tracking ability of such unit in an actual drive is well known.

The tests performed are measurements of the ability of each actuator to follow an idealized error signal (consisting of 0–400 Hz random noise superimposed on a 60 Hz sine wave), which will give a good indication, for instance, of how well the servo head will follow the servo track. Although the data heads of the DF 9300 may not track as well due to thermogradients in the drive ore phenomena which change the radial position of the data head or track relative to the servo head or track, the data heads of the bimorph actuator will track very well as long as there is an accurate error signal available.

Table 1(a) shows the crossover frequency and the phase and gain margins for the DF 9300 actuator and Table 1(b) shows the same values for the bimorph actuator 34.

TABLE 1

COMPENSATION DESIGN RESULTS (a)
DF 9300 Actuator
Lead Network Transfer Function:

| | |
|---|---|
| Integrator Break Frequency | 50 Hz |
| Crossover Frequency | 600 Hz |
| Phase Margin | 35.0 Degrees |
| Gain Margin | 6.2 DB |
| Gain at 60 Hz | 27.0 DB |

(b)
Bimorph Actuator
Lead Network Transfer Function:

| | |
|---|---|
| Integrator Break Frequency | 700 Hz |
| Crossover Frequency | 1895 Hz |
| Phase Margin | 35.0 Degrees |
| Gain Margin | 6.1 DB |
| Gain at 60 Hz | 22.6 DB |

The open-loop transfer function for the bimorph actuator 34 has a resonance below the crossover frequency. This resonance is due to the mass of the heads 38 and flexures 48 and the stiffness of the bimorph actuator 34. Below this frequency the stiffness of the spring (brass shim) is the dominant effect and position is a function only of the voltage applied. Above this frequency, inertia becomes the dominant effect and position becomes a function of the length of time at a given voltage (i.e., the voltage produces acceleration rather than displacement). The maximum displacement of the bimorph actuator 34 is 1.5 mils.

The crossover frequency for the bimorph actuator 34 is 1895 Hz. Because of the high band width the settling time is extremely fast. The response and settling time for a 250 microinch step is 700 microseconds. For comparison, the settling time for the DF 9300 actuator was 1,750 microseconds. The worst case error for the bimorph actuator 34 is 9 microinches, which is extremely small and due, at least in part, to the high crossover frequency. The comparable number for the DF 9300 actuator was 15 microinches (note that this is the residual error after correcting for the idealized error signal already described). Thus, the bimorph actuator 34 tracks extremely well.

However, the primary drawback of the bimorph actuator 34 is its maximum displacement of 1.5 mils. Thus, its precise tracking ability can only be used in a secondary actuator for precision tracking on particular tracks; a primary actuator and control system must still be used to position the head approximately over the track. The actuator also requires a high voltage amplifier ($\pm$200 volt range) to drive the bimorph actuator 34.

Further, the degree of control required for a bimorph actuator 34 requires a very precise and higher order of position error signals than is commonly used today. For a closed-loop control system the error signal must come from the head 38 being actuated and from the disk on which the head tracks. This implies that either an embedded (sector or buried layer) servo is required for each disk surface. Because of the high crossover frequency, a high band width error signal is also required (15 kilohertz minimum sampling rate), if one is to take full advantage of the bimorph actuator's capabilities. At a disk rotational speed of 50 Hz a minimum of 300 sectors would be required. This is much more than normally used, but not necessarily impractical. However a more likely alternative is a buried layer servo, which requires that low frequency positional information (lower frequency than the data) be recorded underneath the data, probably into a higher coercivity portion of the media. Although such technology is theoretically feasible it will probably not become practical for a few years. Thus the full spectrum of advantages available through the use of the bimorph actuator 34 have not yet been achieved.

Having described the preferred embodiment of the present invention, it should be recognized that other embodiments or alternatives to construction may be derived; for example, the actuator supporting the head assembly could be a rotary actuator. The inventor relies on the breadth of the claims set forth below to define the breadth and scope of the invention.

What is claimed is:

1. A transducing head positioning actuator for a magnetic disk having data-storage tracks thereon, comprising:
 a fixed base and an actuator mounting element extending therefrom;
 at least one head positioning member mounted on said element, said head positioning member formed to define a pair of fork arms extending generally toward the disk axis; and
 an elongated piezo-electric bimorph member attached at both ends to and between the fork arms of said head positioning member, with the length thereof generally perpendicular to a radius of said disk, said bimorph member being structured for piezo-electric deformation so that the midportion thereof moves generally to and from along said disk radius; and at least one read/write head being mounted on said midportion of said piezo-electric bimorph member remote from said head positioning member;

first means for energizing said actuator mounting element to sweep said head positioning member across a predetermined set of said tracks;

second means for energizing said piezo-electric member to cause a deformation thereof and to thereby align the read/write head with a predetermined one of said tracks to achieve and to substantially hold a tracking relationship therewith.

2. An actuator as described in claim 1, wherein said bimorph member is formed as a sandwich structure comprising a central vane, a pair of piezo-electric leaves affixed to and sandwiching said vane, said leaves being oriented for bending flexure of said vane, and two sets of electrode elements affixed to the outer sides of said piezo-electric leaves so as to sandwich said leaves and vane, each of said electrode sets comprising three electrodes spaced along the length of said bimorph member, the end electrodes of each set being energized in the same polarity as the middle electrode of the other set and in opposite polarity to that of the end electrodes of the other set, and said midportion of said bimorph member is caused to bend oppositely to the end portions.

3. An actuator as claimed in claim 2 wherein the bimorph member is formed into a flat omega shape to align said head with said track when said member is subjected to piezo-electric deformations.

4. A transducing head positioning actuator for a magnetic disk having data-storage tracks thereon, comprising:

a fixed base and an actuator mounting element extending therefrom;

a plurality of head positioning members mounted on said element in stacked relation, each of said head positioning members formed to defined a pair of fork arms extending generally toward the disk axis; and an elongated piezo-electric bimorph member attached at both ends to and between the fork arms of each head positioning member, with the length thereof generally perpendicular to a radius of said disk, said bimorph member being structured for piezo-electric deformation so that the midportion thereof moves generally to and from along said disk radius; and at least one read/write head being mounted on said midportion of each of said piezo-electric bimorph members and disposed remotely from a respective head positioning member;

first means for energizing said actuator mounting element to sweep said stack of head positioning members across a predetermined set of said tracks;

second means for energizing each of said piezo-electric members to cause a deformation thereof and to thereby align the read/write head with a predetermined one of said tracks to achieve and to substantially hold a tracking relationship therewith.

* * * * *